United States Patent [19]

Miraucourt et al.

[11] Patent Number: 4,759,687

[45] Date of Patent: Jul. 26, 1988

[54] TURBINE RING INCORPORATING ELEMENTS OF A CERAMIC COMPOSITION DIVIDED INTO SECTORS

[75] Inventors: Carmen Miraucourt, Brie Comte Robert; Remy P. C. Ritt, Vaux le Penil, both of France

[73] Assignee: Societe Nationale d'Etude et de Construction de Moteurs d'Aviation, "S.N.E.C.M.A.", Paris, France

[21] Appl. No.: 40,788

[22] Filed: Apr. 21, 1987

[30] Foreign Application Priority Data

Apr. 24, 1986 [FR] France ................................ 86 05924

[51] Int. Cl.[4] ........................ F01D 25/24; F03D 11/00

[52] U.S. Cl. .................................... 415/127; 415/128; 415/174; 415/197; 415/196; 415/137; 415/138

[58] Field of Search ............... 415/127, 128, 174, 197, 415/116, 196, 134, 135, 136, 137, 138; 248/DIG. 1; 138/143, 175, DIG. 11

[56] References Cited

U.S. PATENT DOCUMENTS 3,860,358 1/1975 Cavicchi et al. .................... 415/174
4,087,199 5/1978 Hemsworth et al. ............... 415/197
4,337,016 6/1982 Chaplin .............................. 415/166
4,643,638 2/1987 Laurello ............................. 415/136

FOREIGN PATENT DOCUMENTS 0119881 9/1984 European Pat. Off. .
2540938 8/1974 France .
2371575 6/1978 France .
2428141 1/1980 France .
2559834 8/1985 France .

*Primary Examiner*—Robert E. Garrett
*Assistant Examiner*—Therese Newholm
*Attorney, Agent, or Firm*—Oblon, Fisher, Spivak, McClelland & Maier

[57] ABSTRACT

A turbine ring comprises an annular support in two parts and a ring of ceramic sectors for sealing purposes. The two parts of the support are interconnected by an axial groove and a sliding male part. Each part comprises an axial annular groove in which is engaged a respective axial edge portion of each sector. The cooperating internal radial faces respectively of the edge portion and of the groove are circumferential, while the radially outer radial face of each sector comprises at least one flat zone. The corresponding face of each groove may be polygonal.

10 Claims, 3 Drawing Sheets

TURBINE RING INCORPORATING ELEMENTS OF A CERAMIC COMPOSITION DIVIDED INTO SECTORS

BACKGROUND OF THE INVENTION

1. Field of the Invention

The present invention relates to a turbine ring incorporating elements of a ceramic composition divided into sectors forming portions of the stator of a turbo machine.

2. SUMMARY OF THE PRIOR ART

FR-A-No. 2 371 575 describes a gas turbine ring comprising a two-part annular support fixed to the inside of the turbine casing and a ring of ceramic material which has good abradability and erosion properties, which has a high strength at high temperatures, and which serves as a thermal barrier. Such a ceramic ring is formed in sectors. A specific mounting arrangement of ceramic sectors in the metallic support employs resilient means intended to ensure high strength in service, while taking into account differential thermal expressions which give rise to mechanical stresses between ceramic elements and the metallic support and while talking into account the low ductility and a relatively fragile nature of the ceramic material used.

Such known arrangements have, however, been shown to be inadequate for certain applications in turbo machines where high performance and in particular high temperatures of operation apply. Constructions embodying the invention are intended to provide sealing, both at the upstream and on the downstream side, defined with respect to the normal direction of flow of the gases within the turbo machine, together with an improved location of the sectors and the invention envisages a specific mode of mounting of the sectors of the ceramic ring which enables the sectors to deform without introduction of excessive mechanical stresses within the sectors, and in particular tensile stresses on the outer face of the sectors.

SUMMARY OF THE INVENTION

According to the present invention there is provided in a turbine ring assembly a turbine casing, an annular support comprising a first part secured to the inside of turbine casing, and a second part secured to the inside of the turbine casing. Means are operative between the first and second parts to connect the parts. Those means define an angular groove having a depth dimension extending axially of the turbine ring. Further means define an annular member slidably engaged in the annular groove. Still further means define an annular U-shaped groove opening in the axial direction of the ring and rigid with the first part of the annular support. The U-shaped groove has a radially inner and a radially outer face each extending circumferentially and facing one another. Further means define a further annular-shaped groove opening in the axial direction of the ring. The U-shaped grooves open towards one another and include a radially inner and a radially outer face each extending circumferentially and facing one another. An annular ceramic sealing ring comprises a plurality of contiguous part-annular sectors each having an upstream and a downstream edge portion. The radially outer edge portion of each sealing ring has at least one flat zone. The edge portions of the sectors are engaged in the U-shaped grooves so that the radially outer face engages against the radially outer circumferential face of each groove. Finally, the flat zones define spacings between the circumferential faces of the U-shaped grooves and the ceramic of the sectors thereby reducing stresses in the sectors at elevated temperatures.

Prefrably, the radially outer part of a first part of the annular support is retained between a radially internal flange of the turbine casing and a cylindrical part extended by a radial flange secured between two radial flanges of the casing. The radially outer part of a second part of the annular support comprises an axial flange slidable in an annular groove formed in a radially inwardly extending flange of the turbine casing. An annular flexible member is fixed at one end to a flange of the turbine casing, its other end being in axial contact with the radially inner part of the second part of the annular support, in the zone of corresponding axial edges of the sectors.

Preferably, at least one flat zone can also be produced on the inner radial face of an axial edge of the sectors.

DESCRIPTION OF THE PREFERRED EMBODIMENTS

Figure 1:
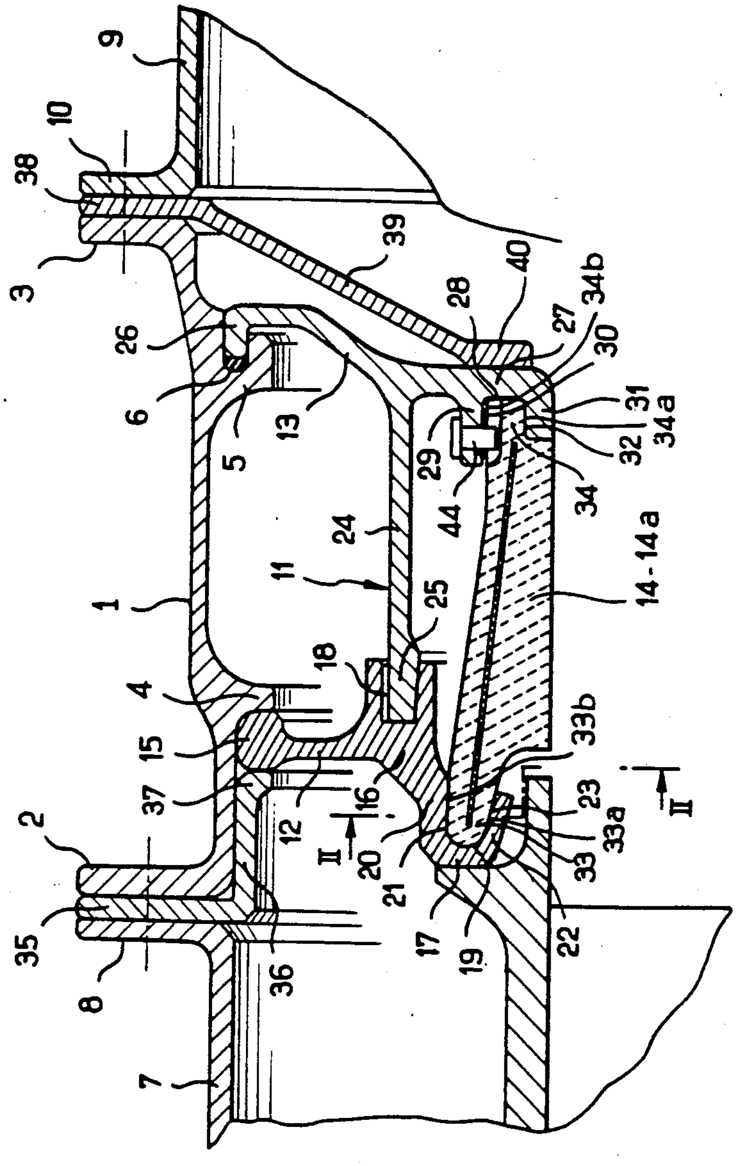
FIG. 1 is a fragmentary view, in longitudinal section, on a half axial plane, showing the casing of a turbine, provided with a ring according to the present invention.

FIG. 1 illustrates part 1 of the casing of a gas turbine. This part 1 of the casing respectively comprises at each end an axial annular upstream flange 2 and an annular radial downstream flange 3, both extending outwardly, the terms upstream and downstream being defined with respect to the normal direction of flow of gases in the turbo machine of which the turbine ring forms a part. The casing part 1 also comprises two annular radial flanges extending inwardly towards the longitudinal axis of the machine, the upstream one being referenced 4 and the downstream 5. An annular axially extending groove 6 is defined by the downstream inner, radially extending flange 5.

A part 7 of the casing cooperates with the radial flange 2 of the part 1 of the casing and is disposed upstream of the part 1. The connection between the flange 2 and the part 1 is provided by an annular radially-outwardly extending flange 8. A part 9 of the casing is disposed downstream of the part 1 and cooperates with the radial flange 3 of the part 1 of the casing by means of an annular radially outwardly extending flange 10.

A turbine ring 11 is located within the casing 1 of the turbine and comprises a first part 12 of an annular support located upstream, a second part 13 of the annular support located downstream and a fluid-tight sealing ring 14. The first part 12 of the annular support comprises a radially outer part 15, an intermediate part 16, and a radially inner part 17. An annular axial-extending groove 18 opening in the downstream direction is provided in the intermediate part 16. An annular groove extending generally axially and denoted by the reference 19 is in the form of an open U, facing in the downstream direction, having a radially outer branch 20 with an inner face 21 and a radially-inner branch 22 with an inner face 23.

The second part 13 of the annular support comprises a cylindrical member 24 extending in the upstream direction from a median radial zone of the second part 13. The first and second parts 12 and 13 of the annular support are connected at the groove 18 by means of an annular enlargement 25 slidable axially and extending from the end of the cylindrical member 24. The radially outer part of the second part 13 of the annular support comprises an axially-extending edge portion 26 extending in the upstream direction. In a similar manner to that of the first part 12, the second part 13 of the annular support comprises, at its radially inner part 27, an axially-extending groove 28 in the form of a flattened U facing in the upstream direction, and having a radially outer branch 29 with an internal face 30 and a radially inner branch 31 with an internal face 32.

The fluid-tight seal ring 14 is built up from a circumferential series of contiguous sectors **14*a* of a ceramic material adequate to withstand operating conditions such as a known composite formed by fibres embedded in a matrix of the same material and which has good strength properties at elevated temperatures, good abradable and erosion properties, and low thermal conductivity which is thus able to confer on the material the characteristics of a thermal barrier. Each ceramic sector 14*a* comprises axially respectively an upstream axial edge portion 33 and a downstream axial edge portion 34, which cooperate with axially extending annular grooves of the support, respectively 19 upstream and 28 downstream. The radially inner faces 33*a* and 34*a* of the axial edge portions 33 and 34 of the sectors 14*a* extend circumferentially and as a result are in contact over the whole surface with the respective inner face 23 and 32 of the radially-outer branches 22 and 31 defining the axial grooves 19 and 28**.

Figure 2:
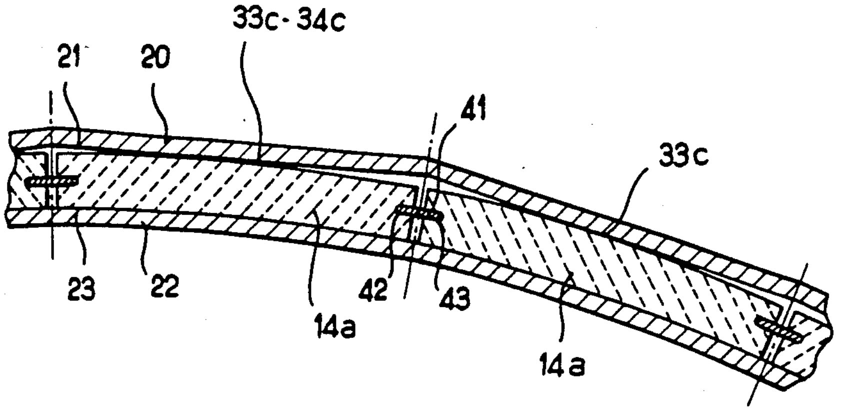
FIG. 2 is a fragmentary view, in cross-section, on the line II—II of FIG. 1, showing the axial edges of the sectors of the ring as mounted in their respective locations.

According to the main embodiment illustrated in FIG. 2, the inner faces 21 and 30 of the radially outer branches 20 and 29 forming axial grooves 19 and 28 have a polygonal peripheral shape. Preferably, each side of the polygon corresponds with the zone of one sector. In this embodiment, each sector **14*a* has a radially outer face 33*b* and 34*b* of the axial edge portions 33 and 34 respectively comprising a flat zone 33*c* where, in a manner similar to that of the upper end, 34*c*, situated in the median zone of each sector and on which contact is made between the sector 14*a* and the parts 12 and 13 of the support, as illustrated in FIG. 1**.

Between the radially outer flanges 2 and 8 of the casing a radial flange 35 of a cylindrical part 36 is inserted and secured within the part 1 of the turbine and concentrically therewith. The downstream end 37 of the cylindrical part 36 engages the radially outer part 15 of the first part 12 of the annular support and thus holds it in contact against the inwardly-extending upstream flange 4 of the casing. Similarly, between the outer flanges 3 and 10 of the casing a radial flange 38 of an annular, frusto-conical flexible member 39 is inserted and secured. The inner edge 40 of the flexible member 39 is in axial contact with the inner part 27 of the second part 13 of the annular support.

In operation, particularly when high temperatures are attained at the inlet of the turbine, the turbine ring according to the invention which has just been described ensures proper sealing both upstream and downstream. In practice, a permanent contact is ensured between, on the one hand, the respective upstream and downstream axial edge portions respectively 33 and 34, of the sectors **14*a* of the ring and of the bottoms of the axial grooves, respectively 19 and 28, on the other hand. The axial engagements provided by the downstream end 37 of the cylindrical part 36 on the inner flange 4 of the part 1 and by the annular edge 40 of the annular member 39 enable, owing to the flexibility of the annular member 39, accommodation of the differences in axial expansions of thermal origin between the sectors 14*a* of the ring and of the part 1** of the turbine.

Moreover, the limitation of contact between the outer face, respectively **33*b* and 34*b* of each axial edge portion 33 and 34 of the sector 14*a* of the inner face, respectively at 21 and 30, of the radially-outer branch 20 and 29 of the U-shaped groove 19 and 28, at the flat median zone, respectively 33*c* and 34*c*, enables deformation of the annular sectors 14*a* under the action of thermal gradients without the generation of mechanical stresses in excess of the strength capacities of the ceramic composite material forming the said sectors 14*a*, in particular the tensile strength on the outer face of each sector 14*a*. At the same time, radial and circumferential restraint of the sectors 14*a* is provided. Moreover, small tabs 41 are axially engaged in grooves 42 and 43 formed at the same radial distance in the flanks opposite to contiguous sectors 14*a* and thus between the sectors. Means for preventing rotation, for example a pin 44, is provided between an axial edge portion, for example the axial edge portion 34 of the sector 14*a*, and the radially-outer branch 29 of the axial groove 28 of the second part 13** of the annular support.

Figure 3:
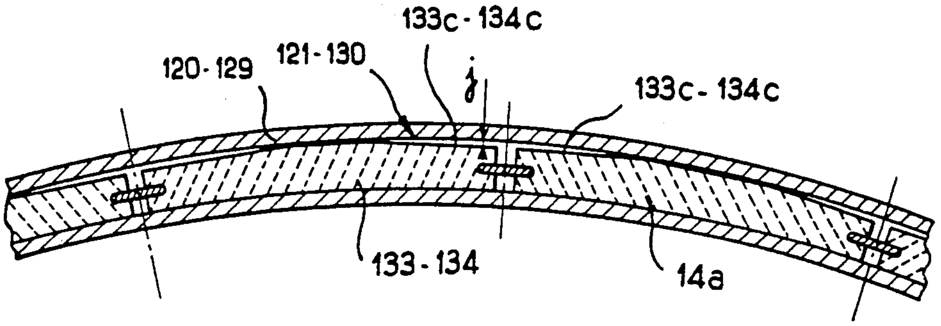
FIG. 3 is a view similar to that of FIG. 2, illustrating a first modification of the embodiment of FIGS. 1 and 2.

The invention is not to be considered to be limited to the embodiment hereinbefore described. It encompasses all modifications, of which a few only will be indicated hereinafter, by way of non-limiting example. One such modification is illustrated in FIG. 3. Flat zones **133*c* formed on the radially outer face of the axial edge portion 133 of each sector 14*a* are provided at each circumferential end of the sector at the upstream side, and similar remarks apply to flat zones 134*c* of the axial edges 134, on the downstream side. In accordance with this modification, the respective inner faces 121 and 130 of the outer branches 120 and 129 of the axial grooves 19 and 28 of the annular support 12–13 (illustrated in FIG. 1) are circumferential. Thus, as in the preceding embodiment described with reference to FIGS. 1 and 2, the contact zone between the outer face of each sector 14*a* and the axial face of the groove is located in the median circumferential zone of each sector, and the circumferential zones at each end have a clearance j between the outer face of the sector and the cooperating face of the groove. As hereinbefore, in operation and in particular at high temperatures, the ring sectors 14*a*** can deform under the action of a thermal gradient without being subjected to mechanical excessive stresses which would, in the absence of the mounting arrangement provided in accordance with the invention, by liable to give rise to deterioration of the sectors adverse to the length of service of the turbine rings.

Figure 4:
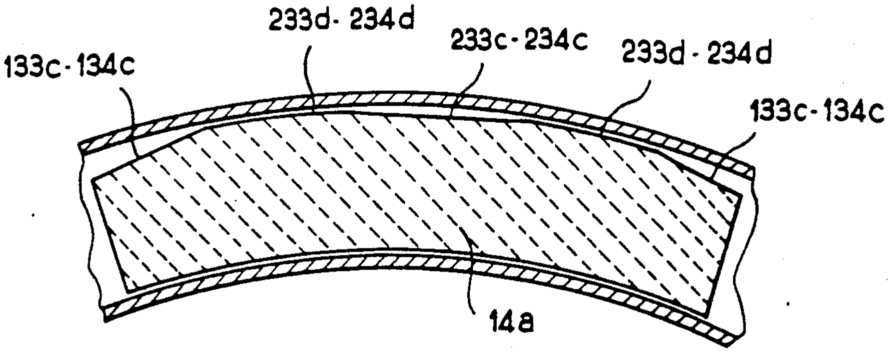
FIG. 4 is a similar fragmentary view to that of FIGS. 2 and 3, illustrating a second modification of the embodiment of FIGS. 1 and 2.

FIG. 4 illustrates another modification. As in the modification illustrated in FIG. 3 and hereinbefore described, the face of the groove cooperating with the radially outer face of the sectors of the ring 14a is circumferential and this radially-outer face of the sector 14a also comprises a flat zone at each circumferential end of the axial edge portion. According to this modification, a third flat zone, respectively 233c and 234c, is provided in the circumferential median zone of each axial edge of the sector 14a. In this way, each sector 14a has two circumferentially-spaced zones, respectively 233d on the axial upstream edge 33 and 234d on the axial downstream edge 34 (edges illustrated in FIG. 1), which are in contact with the circumferential face of the groove. As hereinbefore, a minimization of the mechanical stresses exerted on the sectors 14a under the action of the thermal gradient is thus ensured.

Figure 5:
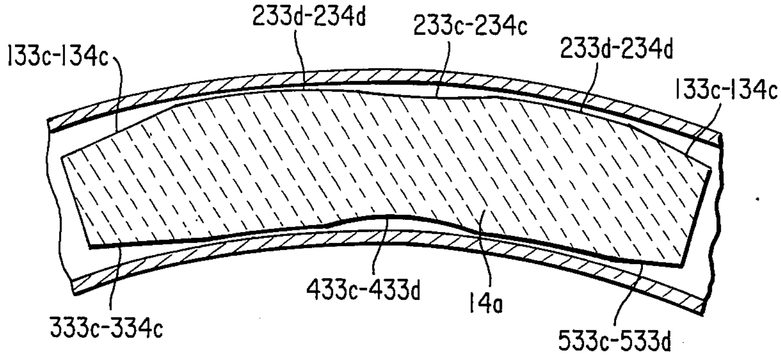
FIG. 5 is a fragmentary view similar to FIGS. 2, 3 and 4, illustrating a third modification of the embodiment of FIGS. 1 and 2.

Finally, as illustrated in FIG. 5, it is possible in certain particular applications to apply to the internal diameter of the ceramic sectors the same configurations which have been described for their outer diameter. This modification can also be applied to each of the three modifications hereinbefore descrived with reference respectively to FIGS. 2, 3 and 4. FIG. 5 illustrates this modification as applied to the embodiment of FIG. 4. The radially inner face of the axial edges 33 and 34 of the sectors 34a, instead of being circumferential as illustrated at 33a and 34a in FIG. 1, have flat zones 333c, 433c and 533c and in a similar manner at the other end, 333d, 433d and 533d, so as to provide regular support of the sectors 14a on the inner faces respectively 23 and 32, of the radially inner branches 22 and 31 defining the U-shaped axial grooves 19 and 28 (see FIG. 1).

What is claimed is:

1. A turbine ring assembly comprising:

(a) a turbine casing and (b) an annular support comprising:

(i) a first part secured to the inside of said turbine casing;

(ii) a second part secured to the inside of said turbine casing;

(iii) first means operative between said first and second parts to connect said first and second parts, said first means including:

(A) second means defining an annular groove having a depth dimension extending axially of said turbine casing and (B) third means defining an annular member slidably engaged in said annular groove;

(iv) fourth means defining a first annular U-shaped groove opening in the axial direction of said turbine casing and rigid with said first part of said annular support, said first annular U-shaped groove having a radially inner and a radially outer face each extending circumferentially and facing one another;

(v) fifth means defining a second annular U-shaped groove opening in the axial direction of said turbine casing, said second annular U-shaped groove opening toward said first annular U-shaped groove and including a radially inner and a radially outer face each extending circumferentially and facing one another; and (vi) an annular ceramic sealing ring comprising a plurality of contiguous part-annular edge sectors, each one of said plurality of contiguous part-annular edge sectors having an upstream edge portion and a downstream edge portion, the radially outer edge portion of each one of said plurality of contiguous part-annular edge sectors having at least one flat zone, the edge portions of each one of said plurality of contiguous part-annular edge sectors being engaged in said first and second annular U-shaped grooves so that the radially outer face of each one of said plurality of contiguous part-annular edge sectors engages against the radially outer circumferential face of each one of said first and second annular U-shaped grooves, said at least one flat zone on each one of said plurality of contiguous part-annular edge sectors defining a spacing between said radially outer circumferential face of the corresponding one of said first and second annular U-shaped grooves and said each one of said plurality of contiguous part-annular edge sectors, thereby reducing stresses in said plurality of contiguous part-annular edge sectors at elevated temperatures.

2. A turbine ring assembly comprising:

(a) a turbine casing and (b) an annular support comprising:

(i) a first part secured to the inside of said turbine casing;

(ii) a second part secured to the inside of said turbine casing;

(iii) first means operative between said first and second parts to connect said first and second parts, said first means including:

(A) second means defining an annular groove having a depth dimension extending axially of said turbine casing and (B) third means defining an annular member slidably engaged in said annular groove;

(iv) fourth means defining a first annular U-shaped groove opening in the axial direction of said turbine casing and rigid with said first part of said annular support, said first annular U-shaped groove having a radially inner and a radially outer face each extending circumferentially and facing one another;

(v) fifth means defining a second annular U-shaped groove opening in the axial direction of said turbine casing, said second annular U-shaped groove opening toward said first annular U-shaped groove and including a radially inner and a radially outer face each extending circumferentially and facing one another; and (vi) an annular ceramic sealing ring comprising a plurality of contiguous part-annular edge sectors, each one of said plurality of contiguous part-annular edge sectors having an upstream edge portion and a downstream edge portion, the radially outer edge portion of each one of said plurality of contiguous part-annular edge sectors having at least one flat zone, the edge portions of each one of said plurality of contiguous part-annular edge sectors being engaged in said first and second annular U-shaped grooves so that the radially outer face of each one of said plurality of contiguous part-annular edge sectors engages against the radially outer circumferential face of each one of said first and second annular U-shaped grooves, said at least one flat zone on each one of said plurality of contiguous part-annular edge sectors defining a spacing between said radially outer circumferential face of the corresponding one of said first and second annular U-shaped grooves and said each one of said plurality of contiguous part-annular edge sectors, thereby reducing stresses in said plurality of contiguous part-annular edge sectors at elevated temperatures, (c) wherein:

(i) said radially inner face of each one of said first and second annular U-shaped grooves is polygonal;

(ii) said at least one flat zone of each one of said plurality of contiguous part-annular edge sectors lies in the median zone of said each one of said plurality of contiguous part-annular edge sectors; and (iii) each side of said radially inner face of each one of said first and second annular U-shaped grooves corresponds to one of said plurality of contiguous part-annular edge sectors.

3. An assembly according to claim 1 wherein each sector comprises on the radially outer face of each axial edge portion a said flat zone at each end, these two zones being connected by a circumferential zone and the radially inner face of the U-shaped grooves of the annular support extends circumferentially.

4. A turbine assembly comprising:

(a) a turbine casing and (b) an annular support comprising:

(i) a first part secured to the inside of said turbine casing;

(ii) a second part secured to the inside of said turbine casing;

(iii) first means operative between said first and second parts to connect said first and second parts, said first means including:

(A) second means defining an annular groove having a depth dimension extending axially of said turbine casing and (B) third means defining an annular member slidably engaged in said annular groove;

(iv) fourth means defining a first annular U-shaped groove opening in the axial direction of said turbine casing and rigid with said first part of said annular support, said first annular U-shaped groove having a radially inner and a radially outer face each extending circumferentially and facing one another;

(v) fifth means defining a second annular U-shaped groove opening in the axial direction of said turbine casing, said second annular U-shaped groove opening toward said first annular U-shaped groove and including a radially inner and a radially outer face each extending circumferentially and facing one another; and (vi) an annular ceramic sealing ring comprising a plurality of contiguous part-annular edge sectors, each one of said plurality of contiguous part-annular edge sectors having an upstream edge portion and a downstream edge portion, the radially outer edge portion of each one of said plurality of contiguous part-annular edge sectors having at least one flat zone, the edge portions of each one of said plurality of contiguous part-annular edge sectors being engaged in said first and second annular U-shaped grooves so that the radially outer face of each one of said plurality of contiguous part-annular edge sectors engages against the radially outer circumferential face of each one of said first and second annular U-shaped grooves, said at least one flat zone on each one of said plurality of contiguous part-annular edge sectors defining a spacing between said radially outer circumferential face of the corresponding one of said first and second annular U-shaped grooves and said each one of said plurality of contiguous part-annular edge sectors, thereby reducing stresses in said plurality of contiguous part-annular edge sectors at elevated temperatures, (c) wherein:

(i) each one of said plurality of contiguous part-annular edge sectors comprises on its radially outer face two circumferential zones each one of which cooperates with the radially inner circumferential face of the corresponding one of said first and second annular U-shaped grooves and (ii) said two circumferential zones of each one of said plurality of contiguous part-annular edge sectors is respectively located between an end said flat zone and an intermediate said flat zone.

5. A turbine assembly comprising:

(a) a turbine casing and (b) an annular support comprising:

(i) a first part secured to the inside of said turbine casing;

(ii) a second part secured to the inside of said turbine casing;

(iii) first means operative between said first and second parts to connect said first and second parts, said first means including:

(A) second means defining an annular groove having a depth dimension extending axially of said turbine casing and (B) third means defining an annular member slidably engaged in said annular groove;

(iv) fourth means defining a first annular U-shaped groove opening in the axial direction of said turbine casing and rigid with said first part of said annular support, said first annular U-shaped groove having a radially inner and a radially outer face each extending circumferentially and facing one another;

(v) fifth means defining a second annular U-shaped groove opening in the axial direction of said turbine casing, said second annular U-shaped groove opening toward said first annular U-shaped groove and including a radially inner and a radially outer face each extending circumferentially and facing one another; and (vi) an annular ceramic sealing ring comprising a plurality of contiguous part-annular edge sectors, each one of said plurality of contiguous part-annular edge sectors having an upstream edge portion and a downstream edge portion, the radially outer edge portion of each one of said plurality of contiguous part-annular edge sectors having at least one flat zone, the edge portions of each one of said plurality of contiguous part-annular edge sectors being engaged in said first and second annular U-shaped grooves so that the radially outer face of each one of said plurality of contiguous part-annular edge sectors engages against the radially outer circumferential face of each one of said first and second annular U-shaped grooves, said at least one flat zone on each one of said plurality of contiguous part-annular edge sectors defining a spacing between said radially outer circumferential face of the corresponding one of said first and second annular U-shaped grooves and said each one of said plurality of contiguous part-annular edge sectors, thereby reducing stresses in said plurality of contiguous part-annular edge sectors at elevated temperatures, (c) wherein:

said turbine casing comprises:

(A) a first internal, radially-extending flange;

(B) two spaced, radially outwardly extending flanges; and (C) a second internal, radially-extending flange defining an axially extending groove;

(ii) said turbine assembly further comprises:

(A) two further, spaced, outwardly-extending flanges, one located axially outwardly of each one of said two spaced, radially outwardly extending flanges, and (B) a cylindrical member having a radially-outwardly extending flange;

(iii) said first part of said annular support comprises a radially-outwardly extending portion;

(iv) said radially-outwardly extending portion of said first part of said annular support is engaged between said first internal, radially-extending flange of said turbine casing and one end edge of said cylindrical member;

(v) said radially-outwardly extending flange of said cylindrical member is engaged between one of said two spaced, radially outwardly extending flanges and the adjacent one of said two further, spaced, outwardly-extending flanges;

(vi) said second part of said annular support comprises:

(A) sixth means defining an annular axially-extending edge portion slidably engaging in said axially-extending groove in said second internal, radially-extending flange and (B) a radially-inner portion;

(vii) an annular flexible member is engaged between the other one of said two spaced, radially outwardly extending flanges and the adjacent one of said two further, spaced, outwardly extending flanges; and (viii) a radially inner portion of said annular flexible member contacts the radially-inner portion of said second part adjacent the corresponding axial edges of said plurality of contiguous part-annular edge sectors.

6. An assembly according to claim 1 comprising means for locking the sectors against rotation relative to the annular support, said means including a pin mounted to act between at least one sector and the annular support.

7. An assembly according to claim 1 wherein the radially inner face of the axial edge portion of each one of said plurality of contiguous part-annular edge sectors comprises at least one flat zone associated with at least one circumferential zone of the corresponding radially outer circumferential face of said each one of said plurality of contiguous part-annular edge sectors.

8. An assembly according to claim 7 wherein each sector comprises on the radially inner face of each axial edge portion a said flat zone at each end, these two end zones being connected by a circumferential zone.

9. A turbine assembly comprising:

(a) a turbine casing and (b) an annular support comprising:

(i) a first part secured to the inside of said turbine casing;

(ii) a second part secured to the inside of said turbine casing;

(iii) first means operative between said first and second parts to connect said first and second parts, said first means including:

(A) second means defining an annular groove having a depth dimension extending axially of said turbine casing and (B) third means defining an annular member slidably engaged in said annular groove;

(iv) fourth means defining a first annular U-shaped groove opening in the axial direction of said turbine casing and rigid with said first part of said annular support, said first annular U-shaped groove having a radially inner and a radially outer face each extending circumferentially and facing one another;

(v) fifth means defining a second annular U-shaped groove opening in the axial direction of said turbine casing, said second annular U-shaped groove opening toward said first annular U-shaped groove and including a radially inner and a radially outer face each extending circumferentially and facing one another; and (vi) an annular ceramic sealing ring comprising a plurality of contiguous part-annular edge sectors, each one of said plurality of contiguous part-annular edge sectors having an upstream edge portion and a downstream edge portion, the radially outer edge portion of each one of said plurality of contiguous part-annular edge sectors having at least one flat zone, the edge portions of each one of said plurality of contiguous part-annular edge sectors being engaged in said first and second annular U-shaped grooves so that the radially outer face of each one of said plurality of contiguous part-annular edge sectors engages against the radially outer circumferential face of each one of said first and second annular U-shaped grooves, said at least one flat zone on each one of said plurality of contiguous part-annular edge sectors defining a spacing between said radially outer circumferential face of the corresponding one of said first and second annular U-shaped grooves and said each one of said plurality of contiguous part-annular edge sectors, thereby reducing stresses in said plurality of contiguous part-annular edge sectors at elevated temperatures, (c) wherein:

(i) the radially inner face of the axial edge portion of each one of said plurality of contiguous part-annular edge sectors comprises at least one flat zone associated with at least one circumferential zone of the corresponding radially outer circumferential face of said each one of said plurality of contiguous part-annular edge sectors and (ii) each one of said plurality of contiguous part-annular edge sectors comprises on its radially inner face a flat zone at each end and a flat zone in an intermediate position, said flat zones being connected respectively by two circumferential zones.

10. A turbine assembly comprising:

(a) a turbine casing;

(b) a first annular support part;

(c) a second annular support part, both said first and second annular support parts being mounted within said turbine casing;

(d) means defining in said first and second annular support parts open, opposed, axially-extending grooves; and (e) a plurality of ceramic sectors having opposed edge portions mounted in said axially-extending grooves, (f) each one of said ceramic sectors having at least one flat zone in each edge portion which engages in one of said axially-extending grooves, the material defining said flat zones being spaced from the material defining the corresponding part of said axially-extending groove, thereby reducing stresses in said ceramic sectors.

* * * * *

UNITED STATES PATENT AND TRADEMARK OFFICE
CERTIFICATE OF CORRECTION

PATENT NO. : 4,759,687

DATED : July 26, 1988

INVENTOR(S) : CARMEN MIRAUCOURT and REMY P.C. RITT

It is certified that error appears in the above-identified patent and that said Letters Patent is hereby corrected as shown below:

In column 1, line 22, delete "expressions" and insert --expansions--;

In column 1, line 25, delete "talking" and insert --taking--;

In column 1, line 49, delete "angular" and insert --annular--;

In column 3, line 28, delete "fibres" and insert --fibers--;

In column 4, line 65, delete "by" and insert --be--;

In column 9, line 8, before "said" insert --(i)--.

Signed and Sealed this

Thirty-first Day of January, 1989

*Attest:*

DONALD J. QUIGG

*Attesting Officer*

*Commissioner of Patents and Trademarks*